United States Patent
Bae et al.

(10) Patent No.: US 9,630,124 B2
(45) Date of Patent: Apr. 25, 2017

(54) GAS COLLECTING PLANT AND GAS CONDENSING DEVICE WITH REFLUX SEPARATOR

(71) Applicants: HYUNDAI MOTOR COMPANY, Seoul (KR); KOREA INSTITUTE OF ENERGY RESEARCH, Daejeon (KR)

(72) Inventors: Shin-Tae Bae, Hwaseong-si (KR); Sungchan Nam, Daejeon-si (KR); Sungyeoul Park, Daejeon (KR); Yeoil Yoon, Daejeon (KR)

(73) Assignees: HYUNDAI MOTOR COMPANY, Seoul (KR); KOREA INSTITUTE OF ENERGY RESEARCH, Daejeon (KR)

(*) Notice: Subject to any disclaimer, the term of this patent is extended or adjusted under 35 U.S.C. 154(b) by 0 days.

(21) Appl. No.: 14/960,162

(22) Filed: Dec. 4, 2015

(65) Prior Publication Data

US 2016/0236113 A1    Aug. 18, 2016

(30) Foreign Application Priority Data

Feb. 16, 2015    (KR) .................. 10-2015-0023459

(51) Int. Cl.

| | |
|---|---|
| *B01D 5/00* | (2006.01) |
| *B01D 53/18* | (2006.01) |
| *B01D 53/14* | (2006.01) |
| *B01D 19/00* | (2006.01) |

(52) U.S. Cl.

CPC ......... *B01D 5/0063* (2013.01); *B01D 5/0012* (2013.01); *B01D 5/0069* (2013.01); *B01D 19/0015* (2013.01); *B01D 53/1425* (2013.01); *B01D 53/1475* (2013.01); *B01D 53/18* (2013.01); *Y02C 10/06* (2013.01)

(58) Field of Classification Search
None
See application file for complete search history.

(56) References Cited

U.S. PATENT DOCUMENTS

| 5,507,356 A | 4/1996 | Roth et al. |
|---|---|---|
| 2007/0180855 A1 | 8/2007 | Butts |

FOREIGN PATENT DOCUMENTS

| CA | 2033460 A1 | 8/1991 |
|---|---|---|
| JP | 55-135114 A | 10/1980 |
| JP | 3940461 B2 | 7/2007 |
| JP | 3981465 B2 | 9/2007 |
| JP | 4431812 B2 | 1/2010 |
| KR | 1991-0015325 A | 9/1991 |

*Primary Examiner* — Duane Smith
*Assistant Examiner* — Phillip Shao
(74) *Attorney, Agent, or Firm* — McDermott Will & Emery LLP

(57) ABSTRACT

A gas condensing device may be configured to condense regeneration gas and separate target gas from condensate. The gas condensing device may include: a housing; a condenser mounted in an upper portion of the housing and configured to condense the regeneration gas; and a reflux apparatus mounted in the housing below the condenser and configured to temporarily store the condensate and discharge evaporation gas evaporated from the condensate back to the condenser.

10 Claims, 5 Drawing Sheets

GAS COLLECTING PLANT AND GAS CONDENSING DEVICE WITH REFLUX SEPARATOR

CROSS-REFERENCE TO RELATED APPLICATION

This application claims the benefit of priority to Korean Patent Application No. 10-2015-0023459 filed in the Korean Intellectual Property Office on Feb. 16, 2015, the entire contents of which are incorporated herein by reference.

TECHNICAL FIELD

The present disclosure relates to a gas condensing device with a reflux separator that is applicable to gas-liquid separating process. More particularly, the present disclosure relates to a gas condensing device with a reflux separator which may reduce a mounting space and heat loss by mounting a condenser and a reflux apparatus in one housing.

BACKGROUND

Recently, technique for suppressing release of carbon dioxide into the atmosphere has been developed as global warming and air pollution becomes more severe. Particularly, a method of efficiently trapping carbon dioxide emitted from thermoelectric power plants or boiler equipment has been increasingly developed.

Among various methods of trapping gas, it is widely known that chemical absorption method using absorbent liquid is most suitable for trapping carbon dioxide of large capacity. According to a gas collecting plant using the chemical absorption method, carbon dioxide emitted from thermoelectric power plants or boiler equipment is absorbed in absorbent liquid in an absorption tower and saturated absorbent liquid containing carbon dioxide is heated in a regeneration tower so as to separate regeneration gas containing the carbon dioxide from the absorbent liquid.

According to a conventional gas collecting plant, the carbon dioxide and the absorbent liquid are contacted with each other at a rectifier mounted in the absorption tower. At this time, an apparatus for collecting the absorbent liquid at a center portion of the rectifier is mounted in a filler or a separating plate for separating gas evenly is mounted in an upper portion of the absorption tower so as to prevent channeling occurring when the absorbent liquid passes through the filler in the rectifier. That is, channeling of gas and liquid is prevented by changing a structure of an upper portion of the absorption tower. However, it is very difficult to control abnormal phenomena due to fast linear velocity of gas at a lower portion of the absorption tower and absorbent liquid drop.

In addition, a reboiler for heating the absorbent liquid is mounted at the regeneration tower as energy source for regeneration. The reboiler heats the absorbent liquid up to a temperature at which the regeneration is possible so as to separate the gas contained in the absorbent liquid. The gas separated from the absorbent liquid moves to an upper portion of the regeneration tower such that useful material is collected into a condenser and the gas that is removing object is discharged from the regeneration tower.

Conventionally, a reboiler of kettle type or a reboiler of thermocyphon type is used.

The reboiler of kettle type includes first and second parts therein divided by a wall. A heater or a heat-exchanger is disposed in the first part and an absorbent liquid outlet is formed at the second part. If the absorbent liquid containing the gas is supplied to an upper portion of the reboiler, a level of the absorbent liquid in the reboiler rises. At this time, the absorbent liquid is heated by the heater or the heat-exchanger and the gas is separated from the absorbent liquid and moves upwardly. As the absorbent liquid is supplied continuously, the absorbent liquid from which the gas is removed or which contains less gas crosses the wall and moves to the second part. After that, the absorbent liquid is discharged from the reboiler through the absorbent liquid outlet. According to the reboiler of kettle type, slosh occurs due to liquid wave generated by liquid drop and boiling of mixed liquid. Therefore, it is very difficult to control a level of the absorbent liquid precisely.

The reboiler of thermocyphon type includes a heater or a heat-exchanger therein and an absorbent liquid outlet is formed at a bottom surface of the reboiler. If the absorbent liquid containing the gas is supplied to an upper portion of the reboiler, the absorbent liquid in the reboiler is heated by the heater or the heat-exchanger and the gas is separated from the absorbent liquid and moves upwardly. At this time, the absorbent liquid from which the gas is removed or which contains less gas moves toward the bottom surface of the reboiler and is discharged from the reboiler through the absorbent liquid outlet. According to the reboiler of thermocyphon type, a level of the absorbent liquid is hard to be controlled due to boiling. In addition, since there is no wall in the boiler, the mixed liquid remains in the reboiler in a very short time. Therefore, less energy is supplied to the mixed liquid and gas separation efficiency for regeneration is very low.

In addition, a supply path of the mixed liquid and a discharge path of the gas separated from the mixed liquid are same in the reboiler of kettle type and the reboiler of thermocyphon type. Therefore, if bubbles occur due to heating, the mixed liquid cannot reach the heater or the heat-exchanger by the bubbles. If this condition continues, the level of the mixed liquid in the regeneration tower is so raised too high that the absorption tower and the regeneration tower cannot work.

Furthermore, a gas collecting plant using the chemical absorption method includes a condenser for condensing the regeneration gas and generating condensate, and a reflux apparatus for discharging gas evaporated from the condensate to an exterior thereof to collect the gas and supplying the condensate back into the regeneration tower.

According to a conventional gas collecting plant, the condenser and the reflux apparatus are separately disposed in order to control a level of the condensate in the reflux apparatus. As a result, a volume of the gas collecting plant becomes large and a large space is necessary to mount the gas collecting plant. In addition, since the reflux apparatus and the condenser are separated, a large amount of heat loss occurs between the reflux apparatus and the condenser.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a gas condensing device having advantages of reducing a mounting space and heat loss of liquid moving between a condenser and a reflux apparatus by mounting a condenser and a reflux apparatus in one housing.

An embodiment of the present invention provides a gas condensing device having further advantages of facilitating re-condensing evaporation gas by separating a path through which condensate is supplied into a condensate chamber of a housing from a path through which evaporation gas is discharged from the condensate chamber and preventing flow interference between the condensate and the evaporation gas.

A gas condensing device according to an exemplary embodiment of the present invention may condense regeneration gas and separate target gas from condensate.

The gas condensing device may include: a housing; a condenser mounted in an upper portion of the housing and configured to condense the regeneration gas; and a reflux apparatus mounted in the housing below the condenser and configured to temporarily store the condensate and discharge evaporation gas evaporated from the condensate back to the condenser.

In certain embodiments, the reflux apparatus may include: a condensate chamber formed at the lower portion of the housing and configured to temporarily store the condensate; and a reflux separator disposed in the housing between the condenser and the condensate chamber, the reflux separator configured to supply the condensate exiting the condenser to the condensate chamber and discharge the evaporation gas evaporated from the condensate to the exterior of the condensate chamber.

In certain embodiments, the reflux separator may be configured to separate an outlet through which the evaporation gas is discharged from the condensate chamber from an inlet through which the condensate exiting the condenser enters the condensate chamber.

In certain embodiments, the reflux separator may include: a third mounting plate disposed traversely across the housing between the condenser and the condensate chamber and provided with at least one third gas flow hole formed thereon; a third body having a hollow pillar shape mounted on an upper surface of the third mounting plate and having an upper end blocked by a third roof; at least one third gas bypass port formed at a side surface of the third body and enabling fluid communication between an interior of the third body and an exterior of the third body; and a second liquid supplying pipe extending from the third mounting plate into the condensate chamber and configured to supply the condensate into the condensate chamber, wherein the at least one third gas flow hole enables fluid communication between an interior of the housing below the third mounting plate and the interior of the third body.

In certain embodiments, the third gas bypass port may be formed at a set height from the third mounting plate.

In certain embodiments, a target gas outlet configured to discharge the target gas separated from the regeneration gas to the exterior of the gas condensing device may be formed on the housing over the third mounting plate.

In certain embodiments, a condensate outlet for supplying the condensate to a regeneration tower may be formed at a lower portion of the housing and a regeneration gas inlet for receiving the regeneration gas from the regeneration tower may be formed at an upper portion of the housing.

In certain embodiments, t the reflux apparatus may include a reflux separator configured to separate a flow path of the condensate from a flow path of the evaporation gas.

In certain embodiments, the evaporation gas may be discharged from the condensate chamber through the at least one third gas flow hole and the third gas bypass port.

In certain embodiments, the at least one third gas flow hole may be positioned at the interior of the third body and the second liquid supplying pipe may be positioned at the exterior of the third body.

In certain embodiments, an end of the second liquid supplying pipe may be extended close to a lower end of the housing.

According to an exemplary embodiment, a gas collecting plant includes an absorption tower, a regeneration tower, and a gas condensing device.

According to an exemplary embodiment of the present invention, a mounting space and heat loss of liquid moving between a condenser and a reflux apparatus may be reduced by mounting the condenser and the reflux apparatus in one housing.

In addition, in certain embodiments, evaporation gas may be easily re-condensed by separating a path through which condensate is supplied into a condensate chamber of a housing from a path through which evaporation gas is discharged from the condensate chamber and preventing flow interference between the condensate and the evaporation gas.

DETAILED DESCRIPTION

"Rich absorbent liquid" in this specification and claims means absorbent liquid containing large amount of gas that is to be removed or absorbent liquid after absorbing the gas and before regenerating the gas.

"Lean absorbent liquid" in this specification and claims means absorbent liquid from which gas has been separated or which contains a minimum amount or less of an object gas.

"Regeneration" in this specification and claims means separation of gas from absorbent liquid.

"Regeneration gas" in this specification and claims means gas separated from absorbent liquid.

"Object gas" in this specification and claims means gas that is regeneration object, i.e., gas before regeneration.

"Target gas" in this specification and claims means gas that will be separated from the object gas and will be collected.

"Treated gas" in this specification and claims means gas remaining after the object gas is dissolved in absorbent liquid.

"Evaporation gas" in this specification and claims means gas that is evaporated from condensate.

It is to be understood in this specification and claims that an "upper side", an "upper portion" or an "upper end"

includes "one side", "one end portion", "one side portion" or "one end", and a "lower side", a "lower portion" or a "lower end" includes the "other side", the "other end portion", the "other side portion" or the "other end".

In addition, exemplary embodiments of the present invention can be applied to chemical absorption methods for separating gas by heating absorbent liquid after the gas is absorbed in the absorbent liquid as well as chemical absorption method for trapping carbon dioxide. Therefore, it is to be understood that the scope of the present invention is not limited to a gas collecting plant used in chemical absorption methods for trapping the carbon dioxide.

Exemplary embodiments of the present invention will hereinafter be described in detail with reference to the accompanying drawings.

Figure 1:
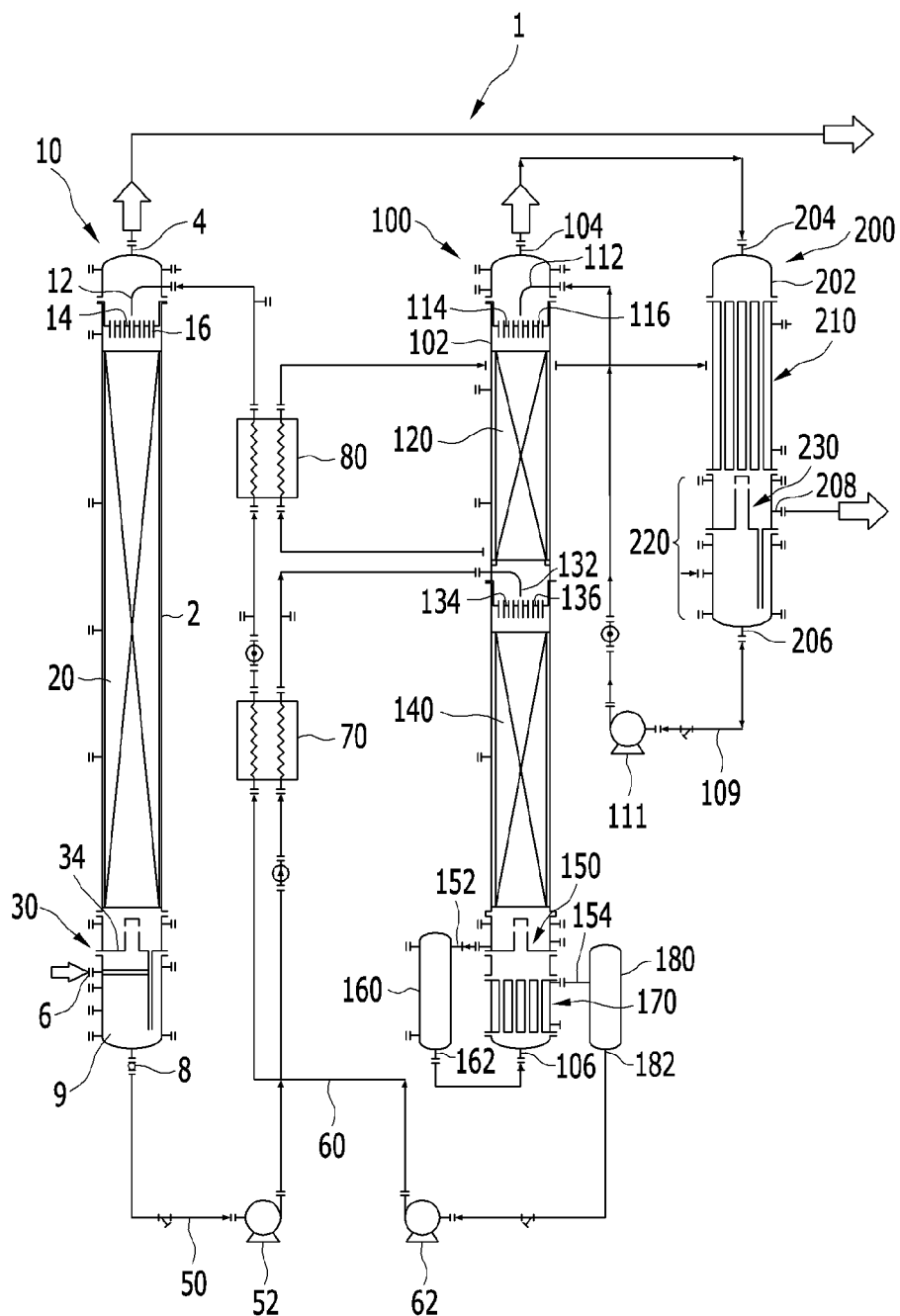
FIG. 1 is a schematic diagram of a gas collecting plant according to an exemplary embodiment of the present invention.
Figure 2:
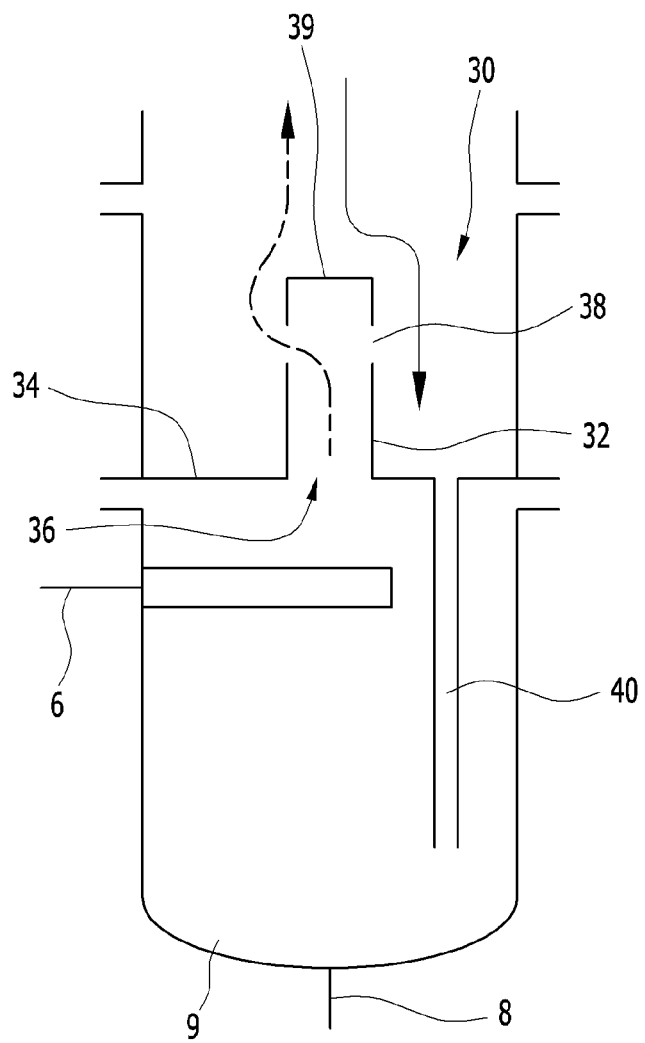
FIG. 2 is a schematic diagram of an absorption separator according to an exemplary embodiment of the present invention.
Figure 3:
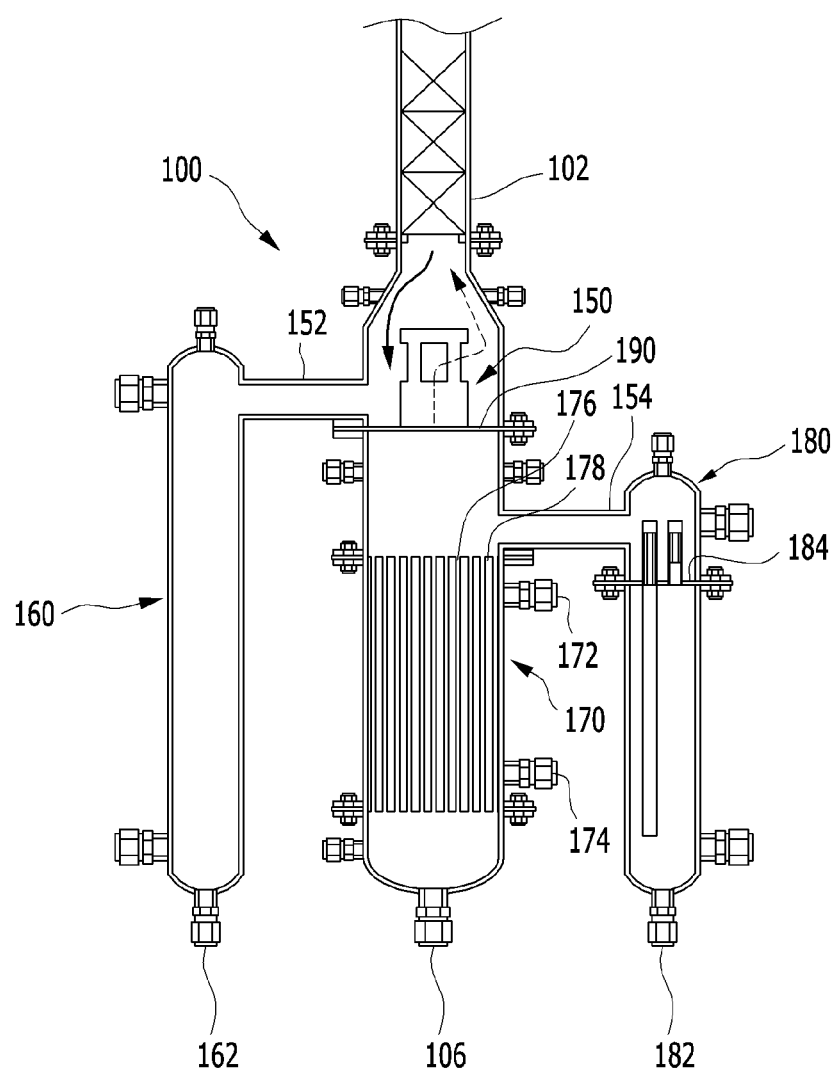
FIG. 3 is a schematic diagram of a reboiling device according to an exemplary embodiment of the present invention.
Figure 4:
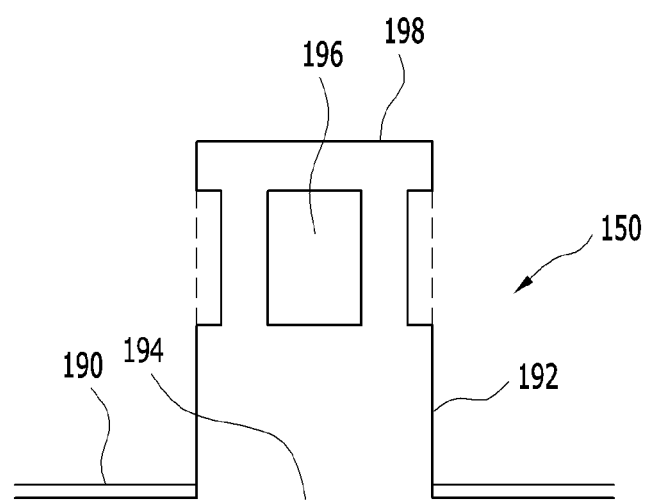
FIG. 4 is a schematic diagram of a regeneration separator according to an exemplary embodiment of the present invention.
Figure 5:
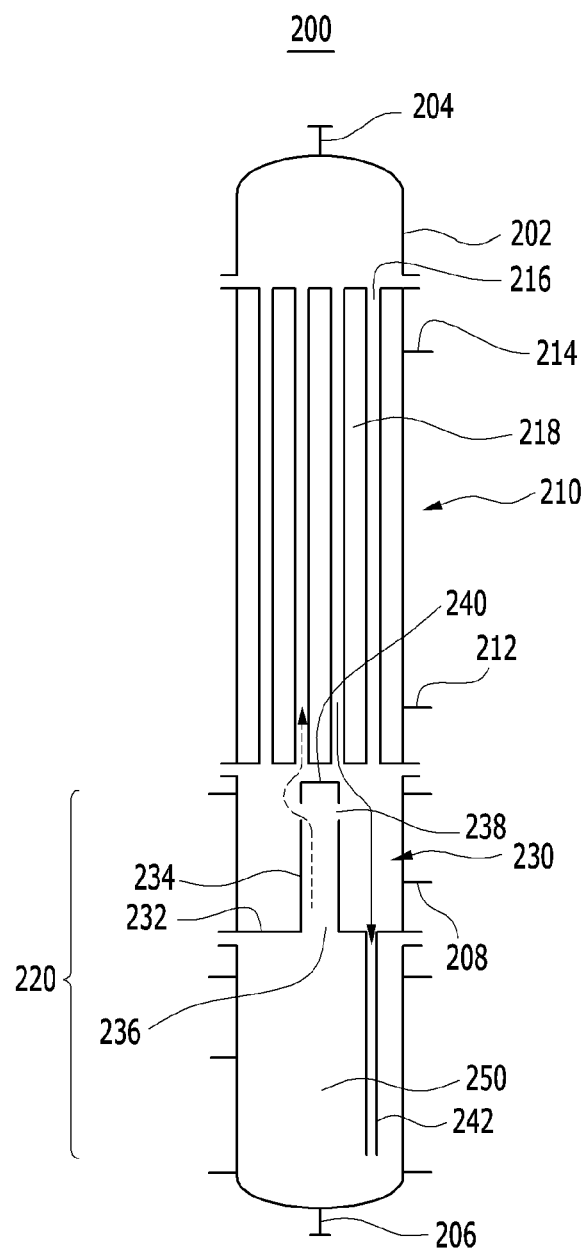
FIG. 5 is a schematic diagram of a gas condensing device according to an exemplary embodiment of the present invention.

FIG. 1 is a schematic diagram of a gas collecting plant according to an exemplary embodiment of the present invention; FIG. 2 is a schematic diagram of an absorption separator according to an exemplary embodiment of the present invention; FIG. 3 is a schematic diagram of a reboiling device according to an exemplary embodiment of the present invention; FIG. 4 is a schematic diagram of a regeneration separator according to an exemplary embodiment of the present invention; and FIG. 5 is a schematic diagram of a gas condensing device according to an exemplary embodiment of the present invention.

As shown in FIG. 1, a gas collecting plant 1 according to an exemplary embodiment of the present invention includes an absorption tower 10, a regeneration tower 100 and a gas condensing device 200.

The absorption tower 10 is configured to dissolve object gas that needs regeneration in lean absorbent liquid so as to produce rich absorbent liquid, and includes an absorption tower housing 2.

In certain embodiments, a space is formed in the absorption tower housing 2, and a lean absorbent liquid supplier 12, a plate 14, an absorption tower rectifier 20 and an absorption separator 30 are sequentially disposed in the space from an upper portion to a lower portion. An absorbent liquid chamber 9 is formed at a lower portion of the absorption tower housing 2, that is, under the absorption separator 30.

In certain embodiments, the lean absorbent liquid supplier 12 is disposed at an upper portion in the absorption tower housing 2 and is connected to a regeneration tower 100 through a lean absorbent liquid line 60. The lean absorbent liquid supplier 12 is configured to supply the lean absorbent liquid received from the regeneration tower 100 through the lean absorbent liquid line 60 into the absorption tower housing 2. The lean absorbent liquid supplied into the absorption tower housing 2 flows downwardly toward the lower portion of the absorption tower housing 2 by gravity.

In certain embodiments, the plate 14 is mounted in the absorption tower housing 2 under the lean absorbent liquid supplier 12. The plate 14 is mounted traversely across the absorption tower housing 2, and at least one penetration hole 16 is formed on the plate 14. The lean absorbent liquid falling toward the lower portion of the absorption tower housing 2 is evenly dispersed in the absorption tower housing 2 by the plate 14 and the penetration hole 16.

In certain embodiments, the absorption tower rectifier 20 is disposed in the absorption tower housing 2 under the plate 14. The absorption tower rectifier 20 may be manufactured by twisting a thin and long wire in an irregular shape, but a method of manufacturing the absorption tower rectifier 20 is not limited to this. On the contrary, a foam plastic having large porosity may be used as the absorption tower rectifier 20. The absorption tower rectifier 20 rectifies the lean absorbent liquid so as to smoothen flow thereof. In addition, the lean absorbent liquid and object gas passing through the absorption tower rectifier 20 meet together and the object gas is dissolved into the lean absorbent liquid, thereby generating the rich absorbent liquid.

In certain embodiments, the absorption separator 30 disposed in the absorption tower housing 2 between the absorption tower rectifier 20 and the absorbent liquid chamber 9. The absorption separator 30 separates an inlet through which the rich absorbent liquid supplied into the absorbent liquid chamber 9 from an outlet through which the object gas flows out from the absorbent liquid chamber. For these purposes, in certain embodiments, the absorption separator 30, as shown in FIG. 2, includes a first mounting plate 34, a first body 32 and a first gas bypass port 38.

In certain embodiments, the first mounting plate 34 is disposed traversely across the absorption tower housing 2 below the absorption tower rectifier 20. At least one first gas flow hole 36 and a first liquid supplying pipe 40 are formed at the first mounting plate 34.

In certain embodiments, the first body 32 is mounted on an upper surface of the first mounting plate 34 and extends upwardly. An upper surface of the first body 32 is blocked by a first roof 39 such that the dropped rich absorbent liquid does not enter an interior of the first body 32 but pools on the first mounting plate 34. The rich absorbent liquid pooled on the first mounting plate 34 is supplied into the absorbent liquid chamber 9 through the first liquid supplying pipe 40. At this time, the first liquid supplying pipe 40 extends toward the lower end of the absorbent liquid chamber 9 and close to a bottom of the absorption tower housing 2. Therefore, the rich absorbent liquid is supplied under a surface of the rich absorbent liquid that is temporarily stored in the absorbent liquid chamber 9, thereby preventing occurrence of big wave on the surface of the rich absorbent liquid that is temporarily stored in the absorbent liquid chamber 9 and facilitating level control of the rich absorbent liquid.

In addition, in certain embodiments, the first body 32 encloses the at least one first gas flow hole 36 so as to prevent the rich absorbent liquid from being directly supplied through the first body 32 to the surface of the rich absorbent liquid that is temporarily stored in the absorbent liquid chamber 9.

In certain embodiments, the at least one first gas bypass port 38 is formed at a side of the first body 32 and fluidly communicates an interior of the first body 32 with an exterior of the first body 32. The at least one first gas bypass port 38 is formed at a predetermined height from the first mounting plate 34 such that the rich absorbent liquid pooled on the first mounting plate 34 is prevented from entering the interior of the first body 32 through the first gas bypass port 38.

In certain embodiments, a treated gas outlet 4, an object gas inlet 6 and an absorption tower outlet 8 are further formed at the absorption tower housing 2.

In certain embodiments, the treated gas outlet 4 is configured to discharge treated gas that remains after being dissolved into the absorbent liquid to the exterior of the absorption tower 10, and is formed at the upper portion of the absorption tower housing 2.

In certain embodiments, the object gas inlet 6 is configured to supply the object gas that needs regeneration into the absorption tower 10, and is formed at the lower portion of the absorption tower housing 2, that is, at the absorbent liquid chamber 9. Therefore, the object gas supplied into the absorbent liquid chamber 9 is dissolved into the absorbent liquid when passing through the absorption separator 30 and the absorption tower rectifier 20, and the treated gas is discharged to the exterior of the absorption tower 10 through the treated gas outlet 4 at the upper portion of the absorption tower housing 2.

In certain embodiments, the absorption tower outlet 8 is formed at a lower end portion of the absorption tower housing 2. Therefore, the rich absorbent liquid that is temporarily stored in the absorbent liquid chamber 9 is supplied to the regeneration tower 100 through the absorption tower outlet 8. For this purpose, the absorption tower outlet 8 is connected to the regeneration tower 100 through a rich absorbent liquid line 50.

In certain embodiments, first and second pumps 52 and 62 are mounted on the rich absorbent liquid line 50 and the lean absorbent liquid line 60 so as to pump the rich absorbent liquid and the lean absorbent liquid, respectively. In addition, at least one heat exchanger 70 and 80 is mounted on the rich absorbent liquid line 50 and the lean absorbent liquid line 60 so as to exchange heat between the lean absorbent liquid and the rich absorbent liquid.

In certain embodiments, the lean absorbent liquid is supplied to the upper portion of absorption tower 10 through the lean absorbent liquid supplier 12, and the object gas is supplied to the absorbent liquid chamber 9 through the object gas inlet 6. The lean absorbent liquid flows downwardly toward the lower portion of the absorption tower 10 by gravity. The object gas flows out from the absorbent liquid chamber 9 through the first gas flow hole 36 and the first gas bypass port 38 of the absorption separator 30 and moves upwardly toward the upper portion of the absorption tower 10. The lean absorbent liquid and the object gas meet together at the absorption tower rectifier 20 and the object gas is dissolved into the lean absorbent liquid so as to produce the rich absorbent liquid.

In certain embodiments, the rich absorbent liquid flows to the lower portion of the absorption tower 10 and is pooled on the first mounting plate 34. After that, the rich absorbent liquid is supplied to the lower portion of the absorbent liquid chamber 9 through the first liquid supplying pipe 40. Therefore, big wave does not occur on the surface of the rich absorbent liquid stored in the absorbent liquid chamber 9, and level control of the rich absorbent liquid may be facilitated. In addition, since a path through which the rich absorbent liquid is supplied into the absorbent liquid chamber 9 and a path through which the object gas flows out from the absorbent liquid chamber 9 are separated, it is prevented that volatile component is removed from the rich absorbent liquid due to fast linear velocity of the object gas and composition of the absorbent liquid composition is changed. As a result, deterioration of efficiency due to change of composition in the absorbent liquid may be prevented.

In certain embodiments, the treated gas remaining after being dissolved in the absorbent liquid moves upwardly toward the upper portion of the absorption tower 10 and is discharged to the exterior of the absorption tower 10 through the treated gas outlet 4.

As shown in FIG. 1, the regeneration tower 100 according to an exemplary embodiment of the present invention includes a regeneration tower housing 102.

In certain embodiments, a space is formed in the regeneration tower housing 102, and a first rich absorbent liquid supplier 112, a first regeneration tower rectifier 120, a second rich absorbent liquid supplier 132 and a second regeneration tower rectifier 140 are sequentially disposed in the space. In addition, a regeneration gas outlet 104 is formed at an upper end of the regeneration tower housing 102, and a rich absorbent liquid inlet 106 is formed at a lower end of the regeneration tower housing 102.

In certain embodiments, the first rich absorbent liquid supplier 112 is disposed at an upper portion in the regeneration tower housing 102, and receives the rich absorbent liquid from the absorbent liquid chamber 9 through the rich absorbent liquid line 50 or receives condensate from the gas condensing device 200 or a heat exchanger (not shown) through a condensate line 109. The first rich absorbent liquid supplier 112 supplies the rich absorbent liquid received through the rich absorbent liquid line 50 and/or the condensate received through the condensate line 109 into the regeneration tower housing 102. The rich absorbent liquid and/or the condensate supplied to the first rich absorbent liquid supplier 112 flows downwardly toward a lower portion of the regeneration tower housing 102 by gravity.

In certain embodiments, a plate 114 is mounted in the regeneration tower housing 102 under the first rich absorbent liquid supplier 112. The plate 114 is mounted traversely across the regeneration tower housing 102, and at least one penetration hole 116 is formed on the plate 114. The rich absorbent liquid and/or the condensate falling toward the lower portion of the regeneration tower housing 102 is evenly dispersed in the regeneration tower housing 102 by the plate 114 and the penetration hole 116.

In certain embodiments, the first regeneration tower rectifier 120 is disposed in the regeneration tower housing 102 under the plate 114. The first regeneration tower rectifier 120 may be manufactured by twisting a thin and long wire in an irregular shape, but a method of manufacturing the first regeneration tower rectifier 120 is not limited to this. On the contrary, a foam plastic having large porosity may be used as the first regeneration tower rectifier 120. The first regeneration tower rectifier 120 rectifies the rich absorbent liquid and/or the condensate so as to smoothen flow thereof.

In certain embodiments, the second rich absorbent liquid supplier 132 is disposed in the regeneration tower housing 102 under the first regeneration tower rectifier 120, and receives the rich absorbent liquid from the absorbent liquid chamber 9 through the rich absorbent liquid line 50. The second rich absorbent liquid supplier 132 supplies the rich absorbent liquid received through the rich absorbent liquid line 50 into the regeneration tower housing 102. The rich absorbent liquid supplied from the second rich absorbent liquid supplier 132 flows downwardly toward the lower portion of the regeneration tower housing 102 by gravity.

In certain embodiments, the rich absorbent liquid supplied to the second rich absorbent liquid supplier 132 may be the same as or different from that supplied to the first rich absorbent liquid supplier 112.

In certain embodiments, the plate 134 is mounted in the regeneration tower housing 102 under the second rich absorbent liquid supplier 132. The plate 134 is mounted traversely across the regeneration tower housing 102, and at least one penetration hole 136 is formed on the plate 134. The rich absorbent liquid and/or the condensate falling downwardly toward the lower portion of the regeneration tower housing 102 is evenly dispersed in the regeneration tower housing 102 by the plate 134 and the penetration hole 136.

In certain embodiments, the second regeneration tower 140 rectifier is disposed in the regeneration tower housing 102 under the plate 134. The second regeneration tower rectifier 140 may be manufactured by twisting a thin and long wire in an irregular shape, but a method of manufacturing the second regeneration tower rectifier 140 is not limited to this. On the contrary, a foam plastic having large porosity may be used as the second regeneration tower rectifier 140. The second regeneration tower rectifier 140 rectifies the rich absorbent liquid and/or the condensate supplied from the first rich absorbent liquid supplier 112 so as to smoothen flow thereof, and rectifies the rich absorbent liquid supplied from the second rich absorbent liquid supplier 132 so as to smoothen flow thereof.

In certain embodiments, the regeneration tower 100 further includes a reboiling device. The reboiling device, as shown in FIG. 1, is disposed below the second regeneration tower rectifier 140 and includes a rich absorbent liquid tank 160, a reboiler 170, a regeneration separator 150 and a lean absorbent liquid tank 180. The reboiling device regenerates gas contained in the rich absorbent liquid supplied from the second regeneration tower rectifier 140.

In certain embodiments, the rich absorbent liquid tank 160, as shown in FIG. 3, fluidly communicates with the regeneration tower housing 102 through a rich absorbent liquid connection line 152 such that the rich absorbent liquid and/or the condensate passing through the second regeneration tower rectifier 140 is supplied to the rich absorbent liquid tank 160 through the rich absorbent liquid connection line 152. A rich absorbent liquid outlet 162 is formed at the lower portion of the rich absorbent liquid tank 160.

In certain embodiments, the reboiler 170 is mounted in the regeneration tower housing 102 below the second regeneration tower rectifier 140, and is positioned above a bottom of the regeneration tower housing 102 by a predetermined distance. The reboiler 170 boils the rich absorbent liquid so as to separate regeneration gas from the rich absorbent liquid. The reboiler 170 includes a rich absorbent liquid inlet 106, a first operating fluid inlet 172, a first circulation line 176, a second circulation line 178 and a first operating fluid outlet 174.

In certain embodiments, the rich absorbent liquid inlet 106 is formed at a lower portion of the regeneration tower housing 102 and fluidly communicates with the rich absorbent liquid outlet 162 so as to receive the rich absorbent liquid from the rich absorbent liquid tank 160. Therefore, the rich absorbent liquid tank 160 supplies the rich absorbent liquid to the regeneration tower housing 102. As the rich absorbent liquid is supplied to the regeneration tower housing 102, a level of the rich absorbent liquid in the regeneration tower housing 102 rises and the rich absorbent liquid is supplied to the reboiler 170.

In certain embodiments, the first operating fluid inlet 172 is formed at a position corresponding to the reboiler 170 of the regeneration tower housing 102 and is configured to supply operating fluid to the reboiler 170. The operating fluid may be water vapor generated in power plants or boiler equipments but may not be limited to this.

In certain embodiments, the first circulation line 176 is formed in the reboiler 170 and the operating fluid through the first operating fluid inlet 172 flows in the first circulation line 176. The first circulation line 176 does not fluidly communicate with the interior of the regeneration tower housing 102.

In certain embodiments, the second circulation line 178 is formed in the reboiler 170 and is formed close to the first circulation line 176. Typically, a portion of the reboiler 170 other than the first circulation line 176 becomes the second circulation line 178. The second circulation line 178 fluidly communicates with the interior of the regeneration tower housing 102 such that the rich absorbent liquid exists in the second circulation line 178 if the level of the rich absorbent liquid supplied to the regeneration tower housing 102 rises. At this time, the rich absorbent liquid in the second circulation line 178 exchanges heat with the operating fluid flowing through the first circulation line 176. Therefore, the regeneration gas is separated from the rich absorbent liquid, and thereby, the lean absorbent liquid is positioned at an upper portion of the reboiler 170. In addition, the regeneration gas separated from the rich absorbent liquid moves upwardly in the regeneration tower housing 102.

In certain embodiments, the first operating fluid outlet 174 is formed at a position corresponding to the reboiler 170 of the regeneration tower housing 102 and the operating fluid circulating through the first circulation line 176 is discharged to the exterior of the regeneration tower housing 102 through the first operating fluid outlet 174.

Herein, it is exemplified but is not limited that the reboiler 170 is a heat exchanger heating the rich absorbent liquid by heat-exchange with the operating fluid. The reboiler 170 may be an electric wire that receives current and generates heat.

In certain embodiments, the regeneration separator 150 is mounted in the regeneration tower housing 102 between the second regeneration tower rectifier and the reboiler 170, and separates a supply path of the rich absorbent liquid into the reboiler 170 from an exhaust path of the regeneration gas generated in the reboiler 170. For these purposes, the regeneration separator 150, as shown in FIG. 4, includes a second mounting plate 190, a second body 192 and a second gas bypass port 196.

In certain embodiments, the second mounting plate 190 is disposed traversely across the regeneration tower housing 102 below a connecting portion of the rich absorbent liquid connection line 152 and the regeneration tower housing 102. At least one second gas flow hole 194 is formed at the second mounting plate 190.

In certain embodiments, the second body 192 is mounted on an upper surface of the second mounting plate 190 and extends upwardly. An upper surface of the second body 192 is blocked by a second roof 198 such that the dropped rich absorbent liquid and/or condensate do not enter an interior of the second body 192 and pool on the second mounting plate 190. The rich absorbent liquid pooled on the second mounting plate 190 moves to the rich absorbent liquid tank 160 through the rich absorbent liquid connection line 152. In addition, the second body 192 encloses the at least one second gas flow hole 194 so as to prevent the rich absorbent liquid pooled on the second mounting plate 190 form being directly supplied to the reboiler 170.

In certain embodiments, the at least one second gas bypass port 196 is formed at a side surface of the second body 192 and fluidly communicates an interior of the second body 192 with an exterior of the second body 192. The at least one second gas bypass port 196 is formed at a predetermined height from the second mounting plate 190 such that the rich absorbent liquid pooled on the second mounting plate 190 is prevented from entering the interior of the second body 192 through the second gas bypass port 196. That is, vertical position of the rich absorbent liquid connection line 152 is lower than that of the at least one second gas bypass port 196.

In certain embodiments, the lean absorbent liquid tank 180, as shown in FIG. 3, fluidly communicates with the regeneration tower housing 102 through a lean absorbent liquid connection line 154 such that the lean absorbent liquid from which the regeneration gas is separated in the reboiler 170 flows into the lean absorbent liquid tank 180 through the lean absorbent liquid connection line 154. A connecting portion of the lean absorbent liquid connection line 154 and the regeneration tower housing 102 is positioned between the second mounting plate 190 and the reboiler 170. Therefore, the rich absorbent liquid undergoing the regeneration in the reboiler 170 is not supplied to the regeneration separator 150 but is supplied to the lean absorbent liquid tank 180.

In certain embodiments, a lean absorbent liquid outlet 182 is formed at a lower end of the lean absorbent liquid tank 180 and is connected to the lean absorbent liquid supplier 12 through the lean absorbent liquid line 60. Therefore, the lean absorbent liquid in the lean absorbent liquid tank 180 is supplied back to the lean absorbent liquid supplier 12 through the lean absorbent liquid line 60. In addition, a supporting plate 184 is mounted in the lean absorbent liquid tank 180 and a level sensor and a pressure sensor may be mounted on the supporting plate 184. The level sensor detects a level of the lean absorbent liquid in the lean absorbent liquid tank 180 and the pressure sensor detects pressure of the lean absorbent liquid tank 180. In addition, the lean absorbent liquid outlet 182 can be closed or open based on detecting results by the level sensor and the pressure sensor.

In certain embodiments, if the rich absorbent liquid is supplied from the absorption tower 10 into the regeneration tower housing 102 through the first rich absorbent liquid supplier 112 or the second rich absorbent liquid supplier 32, the rich absorbent liquid flows downwardly by gravity. At this time, the flow of the rich absorbent liquid is rectified by the first regeneration tower rectifier 120 or the second regeneration tower rectifier.

In certain embodiments, the rich absorbent liquid, as represented by a solid line arrow in FIG. 3, cannot move into the interior of the second body 192 by the second roof 198 but moves onto the second mounting plate 190. Therefore, the rich absorbent liquid pools on the second mounting plate 190. If the level of the rich absorbent liquid pooled on the second mounting plate 190 becomes higher than a height of a lower end of the rich absorbent liquid connection line 152, the rich absorbent liquid is supplied into the rich absorbent liquid tank 160 through the rich absorbent liquid connection line 152 and is then supplied into the regeneration tower housing 102 through the rich absorbent liquid outlet 162 and the rich absorbent liquid inlet 106.

If the level of the rich absorbent liquid in the regeneration tower housing 102 becomes higher and the rich absorbent liquid is supplied into the reboiler 170, the rich absorbent liquid is heated and the regeneration gas is separated from the rich absorbent liquid through heat-exchange between the rich absorbent liquid and the operating fluid. The regeneration gas separated from the rich absorbent liquid, as represented by a dotted line arrow in FIG. 3, moves to the exterior of the second body 192 through the second gas flow hole 194 and the second gas bypass port 196. The regeneration gas moves upwardly and is discharged to the exterior of the regeneration tower housing 102 through the regeneration gas outlet 104.

In certain embodiments, as the rich absorbent liquid is supplied to the reboiler 170 continuously, the level of the lean absorbent liquid from which the regeneration gas is separated becomes higher. If the level of the lean absorbent liquid becomes higher than a height of the lower end of the lean absorbent liquid connection line 154, the lean absorbent liquid is supplied to the lean absorbent liquid tank 180 through the lean absorbent liquid connection line 154. The lean absorbent liquid supplied to the lean absorbent liquid tank 180 is supplied back to the absorption tower 10 through the lean absorbent liquid outlet 182.

As shown in FIG. 1, the gas condensing device 200 according to an exemplary embodiment of the present invention includes a housing 202.

In certain embodiments, a space is formed in the housing 202, a condenser 210 is mounted in an upper portion of the space, and a reflux apparatus 220 is mounted in a lower portion of the space.

The condenser 210 is mounted in the upper portion of the housing 202 and is configured to condense the regeneration gas and separate target gas from condensate. In certain embodiments, the condenser 210 includes a second operating fluid inlet 212, a third circulation line 216, a fourth circulation line 218 and a second operating fluid outlet 214.

In certain embodiments, the second operating fluid inlet 212 is formed at a position corresponding to the condenser 210 of the housing 202 and is configured to supply the operating fluid to the condenser 210. The operating fluid may be coolant but may not be limited to this.

In certain embodiments, the third circulation line 216 is formed in the condenser 210 and the operating fluid through the second operating fluid inlet 212 flows in the third circulation line 216. The third circulation line 216 does not fluidly communicate with the interior of the housing 202.

In certain embodiments, the fourth circulation line 218 is formed in the condenser 210 and is formed close to the third circulation line 216. Typically, a portion of the condenser 210 other than the third circulation line 216 becomes the fourth circulation line 218. The fourth circulation line 218 fluidly communicates with the interior of the housing 202 such that the regeneration gas supplied to the housing 102 passes through the fourth circulation line 218. At this time, the regeneration gas in the fourth circulation line 218 is condensed through heat-exchange with the operating fluid passing through the third circulation line 216. Therefore, the target gas is separated from the condensate and the condensate is supplied to the reflux apparatus 220.

In certain embodiments, the second operating fluid outlet 214 is formed at a position corresponding to the condenser 210 of the housing 102 and the operating fluid passing through the third circulation line 216 is discharged to the exterior of the housing 102 through the second operating fluid outlet 214.

In certain embodiments, the reflux apparatus 220, as shown in FIG. 5, includes a condensate chamber 250 and a reflux separator 230.

In certain embodiments, the condensate chamber 250 is formed at the lower portion of the housing 202 and stores the condensate temporarily.

In certain embodiments, the reflux separator 230 is disposed between the condenser 210 and the condensate chamber 250 in the housing 202. The reflux separator 230 separates an inlet through which the condensate is supplied into the condensate chamber 250 from an outlet through which the evaporation gas is discharged from the condensate chamber 250. For these purposes, in certain embodiments, the reflux separator 230, as shown in FIG. 5, includes a third mounting plate 232, a third body 234 and a third gas bypass port 238.

In certain embodiments, the third mounting plate 232 is disposed traversely across the housing 202 below the condenser 210. At least one third gas flow hole 236 and a second liquid supplying pipe 242 are formed at the third mounting plate 232.

In certain embodiments, the third body 234 is mounted on an upper surface of the third mounting plate 232 and extends upwardly. An upper end of the third body 234 is blocked by a third roof 240 such that the dropped condensate does not enter an interior of the third body 234 but pools on the third mounting plate 232. The condensate pooled on the third mounting plate 232 is supplied into the condensate chamber 250 through the second liquid supplying pipe 242. At this time, the second liquid supplying pipe 242 extends toward the lower end of the condensate chamber 250 and close to a bottom of the condensate chamber 250. Therefore, the condensate is supplied under a surface of the condensate that is temporarily stored in the condensate chamber 250, thereby preventing occurrence of big wave on the surface of the condensate that is temporarily stored in the condensate chamber 250 and facilitating level control of the condensate.

In addition, in certain embodiments, the third body 234 encloses the at least one third gas flow hole 236 so as to prevent the condensate from being directly supplied through the third body 234 to the surface of the condensate that is temporarily stored in the condensate chamber 250.

In certain embodiments, the at least one third gas bypass port 238 is formed at a side of the third body 234 and fluidly communicates an interior of the third body 234 with an exterior of the third body 234. The at least one third gas bypass port 238 is formed at a set height (or in certain embodiments, a predetermined height) from the third mounting plate 232 such that the condensate pooled on the third mounting plate 232 is prevented from entering the third body 234 through the third gas bypass port 238.

In certain embodiments, a regeneration gas inlet 204, a condensate outlet 206 and a target gas outlet 208 are formed at the housing 202.

In certain embodiments, the regeneration gas inlet 204 is formed at an upper end portion of the housing 202 and fluidly communicates with the regeneration gas outlet 104 of the regeneration tower housing 102. Therefore, the regeneration gas generated in the regeneration tower 100 is supplied into the upper end portion of the housing 202 through the regeneration gas outlet 104 and the regeneration gas inlet 204.

In certain embodiments, the condensate outlet 206 is formed at a lower end portion of the housing 202 and is connected to the first rich absorbent liquid supplier 112 through the condensate line 109. Therefore, the condensate that is temporarily stored in the condensate chamber 250 is supplied back to the regeneration tower 100 through the condensate outlet 206 and the condensate line 109. A third pump 111 is mounted on the condensate line 109 so as to pump the condensate in the condensate chamber 250.

In certain embodiments, the target gas outlet 208 is formed between the condenser 210 and the reflux separator 230 at the housing 202. The target gas separated from the condensate in the condenser 210 is discharged from the gas condensing device 200 through the target gas outlet 208 and is then collected in an additional tank.

In certain embodiments, the regeneration gas is supplied to the upper portion of the gas condensing device 200 through the regeneration gas inlet 204. The regeneration gas supplied to the gas condensing device 200 moves downwardly toward the lower portion of the gas condensing device 200 and passes through the condenser 210. At this time, the regeneration gas is condensed in the condenser 210 and is separated into the condensate and the target gas.

In certain embodiments, the target gas is discharged to the exterior of the gas condensing device 200 through the target gas outlet 208, and the condensate is pooled on the third mounting plate 232. After that, the condensate is supplied to the lower portion of the condensate chamber 250 through the second liquid supplying pipe 242. Therefore, big wave does not occur on the surface of the condensate stored in the condensate chamber 250, and level control of the condensate may be facilitated.

In addition, in certain embodiments, the evaporation gas may be evaporated from the condensate that is temporarily stored in the condensate chamber 250. The evaporation gas is discharged from the condensate chamber 250 through the third gas flow hole 236 of the reflux separator 230 and the third gas bypass port 238, and is then condensed in the condenser 210 again. At this time, since a path through which the condensate is supplied to the condensate chamber 250 is separated from a path through which the evaporation gas is discharged from the condensate chamber 250, flow interference between the condensate and the evaporation gas may be prevented, thereby facilitating re-condensing the evaporation gas.

In certain embodiments, the condensate temporarily stored in the condensate chamber 250 is supplied back to the regeneration tower 100 through the condensate line 109.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gas condensing device comprising:
a housing;
a condenser mounted in an upper portion of the housing and configured to condense regeneration gas, thereby forming condensate; and
a reflux apparatus mounted in an lower portion of the housing below the condenser and configured to temporarily store the condensate and discharge evaporation gas evaporated from the condensate back to the condenser,
wherein the gas condensing device separates target gas from the condensate,
wherein the reflux apparatus comprises:
a condensate chamber disposed in the lower portion of the housing and configured to temporarily store the condensate; and
a reflux separator disposed in the housing between the condenser and the condensate chamber, and configured to supply the condensate exiting the condenser to the condensate chamber and discharge the evaporation gas evaporated from the condensate to an exterior of the condensate chamber,
wherein the reflux separator is configured to separate an outlet, through which the evaporation gas is discharged from the condensate chamber, from an inlet, through which the condensate exiting the condenser enters the condensate chamber,
wherein the reflux separator further comprises:
a mounting plate disposed across the housing between the condenser and the condensate chamber and provided with at least one gas flow hole formed thereon;
a body having a hollow pillar shape mounted on an upper surface of the mounting plate and having an upper end blocked by a roof;
at least one gas bypass port formed at a side surface of the body and enabling fluid communication between an interior of the body and an exterior of the body; and
a liquid supplying pipe extending from the mounting plate into the condensate chamber and supplying the condensate into the condensate chamber, wherein at least one gas flow hole enables fluid communication between an interior of the housing below the mounting plate and the interior of the body.

2. The gas condensing device of claim 1, wherein at least one gas bypass port is formed at a set height from the mounting plate.

3. The gas condensing device of claim 1, wherein a target gas outlet configured to discharge the target gas separated from the regeneration gas to an exterior of the gas condensing device is disposed on the housing over the mounting plate.

4. The gas condensing device of claim 1, wherein a condensate outlet for supplying the condensate to a regeneration tower is disposed at a lower portion of the housing, and a regeneration gas inlet for receiving the regeneration gas from the regeneration tower is disposed at an upper portion of the housing.

5. The gas condensing device of claim 1,
wherein the reflux apparatus comprises a reflux separator configured to separate a flow path of the condensate from a flow path of the evaporation gas,
wherein the reflux apparatus further comprises a condensate chamber formed at a lower portion of the housing and configured to temporarily store the condensate,
wherein the reflux separator is disposed within the housing between the condenser and the condensate chamber and is configured to supply the condensate exiting the condenser to the condensate chamber and discharge the evaporation gas evaporated from the condensate to an exterior of the condensate chamber,
wherein the reflux separator is configured to separate an outlet, through which the evaporation gas is discharged from the condensate chamber, from an inlet, through which the condensate passing through the condenser enters the condensate chamber, and
wherein the reflux separator further comprises:
a mounting plate disposed across the housing between the condenser and the condensate chamber and provided with at least one gas flow hole formed thereon;
a body having a hollow pillar shape mounted on an upper surface of the mounting plate and having an upper end blocked by a roof;
at least one gas bypass port formed at a side surface of the body and enabling fluid communication between an interior of the body and an exterior of the body; and
a liquid supplying pipe extending from the mounting plate into the condensate chamber and configured to supply the condensate into the condensate chamber,
wherein the evaporation gas is discharged from the condensate chamber through at least one gas flow hole and the gas bypass port.

6. The gas condensing device of claim 5, wherein at least one gas bypass port is formed at a set height from the mounting plate.

7. The gas condensing device of claim 5, wherein at least one third gas flow hole is positioned at the interior of the body and the liquid supplying pipe is positioned at the exterior of the body.

8. The gas condensing device of claim 5, wherein a target gas outlet configured to discharge the target gas separated from the regeneration gas to the exterior of the gas condensing device is formed on the housing over the mounting plate.

9. The gas condensing device of claim 5, wherein an end of the liquid supplying pipe is extended close to a lower end of the housing.

10. The gas condensing device of claim 5, wherein a condensate outlet for supplying the condensate into the regeneration tower is disposed at a lower portion of the housing and a regeneration gas inlet for receiving the regeneration gas from the regeneration tower is disposed at an upper portion of the housing.

* * * * *